United States Patent
Brausch et al.

(10) Patent No.: US 7,191,935 B1
(45) Date of Patent: Mar. 20, 2007

(54) METHOD OF UPDATING A CONFIGURATION EDITING SYSTEM FOR GENERATING CONFIGURATION DATA FOR AN AUTOMATED BANKING MACHINE

(75) Inventors: Thomas Brausch, North Canton, OH (US); Kevin Rohr, Sheffield Lake, OH (US); Ileana L. Sadin, State College, PA (US)

(73) Assignee: Diebold Self-Service Systems, division of Diebold, Incorporated, North Canton, OH (US)

( * ) Notice: Subject to any disclaimer, the term of this patent is extended or adjusted under 35 U.S.C. 154(b) by 223 days.

(21) Appl. No.: 10/869,030

(22) Filed: Jun. 16, 2004

Related U.S. Application Data

(60) Provisional application No. 60/479,287, filed on Jun. 17, 2003.

(51) Int. Cl.
*G06F 19/00* (2006.01)
(52) U.S. Cl. .......................... 235/379; 706/45; 706/46
(58) Field of Classification Search ................ 235/379; 902/1, 2, 20, 21; 706/45, 46
See application file for complete search history.

(56) References Cited

U.S. PATENT DOCUMENTS 6,292,792 B1 * 9/2001 Baffes et al. ................. 706/45

* cited by examiner

*Primary Examiner*—Karl D. Frech
(74) *Attorney, Agent, or Firm*—Christopher L. Parmelee; Ralph E. Jocke; Walker & Jocke

(57) ABSTRACT

A method of updating a configuration editing system for generating ATM configuration data is provided. The method may include generating configuration editor DLLs. ATM configuration editor software may be operative to detect new configuration editor DLLs and provide to a user a selectable listing of import/export functions responsive to the configuration editor DLLs detected. The steps for generating the configuration editor DLLs may include coding for the DLL, a first function capable of returning a description of an ATM configuration data, a second function capable of opening at least one file that comprises at least one ATM configuration data record, a third function capable of reading at least one ATM configuration data record from the at least one file, a fourth function capable of writing at least one ATM configuration record to the at least one file, and a fifth function capable of closing the at least one file.

20 Claims, 23 Drawing Sheets

```
/*return codes for CFED_*.DLL*/
#define CFED_OK              0    /*successful call           */
#define CFED_NO_FILE         1    /*File was not found        */
#define CFED_INVALID         2    /*file format is invalid    */
#define CFED_FILE_NO_CLOSE   3    /*File could not be closed  */
#define CFED_READ_ERROR      4    /*Could not Read file       */
#define CFED_EOF             5    /*EOF reached               */
#define CFED_WRITE_ERROR     6    /*Could not Write file      */
#define CFED_MISC_ERROR      7    /*Miscellaneous error       */
#define CFED_NO_HANDLE       8    /*handle received was NULL  */
#define CFED_NO_ADDRESS      9    /*GetProcAddress Failed     */
#define CFED_NO_MEM          10   /*memory allocation failed  */

/*struct used in CFED_*.DLL*/
typedef struct
{
        char        FileName[255];
        long int FileType;
}
CFILENAMES;
```

FIG. 4

220 Entry Points

| CFED_FormatName() | Returns a string indicating the name of the file format that the DLL is able to read and write. |
|---|---|
| CFED_Version() | Returns a string indicating the version number of the interface which the DLL supports. Currently the only interface version is 1.10. |
| CFED_GetFileOrg() | Returns whether the records for the DLL are in several files or a single file. |
| CFED_Open() | Opens the file(s) that the DLL needs to read or write the data. |
| CFED_Close() | Closes any open file(s). |
| CFED_DataRead() | Reads a record |
| CFED_DataWrite() | Writes a record |

FIG. 5

```
typedef struct                    240
{
    long int recordmap;       /*bitmap indicating which record types to process    */
    long int tempstatus;      /*holds status so that EOF isn't returned to the     */
                              /*application before all processes are performed     */
    bool process;             /*indicates if next record should be processed       */
    bool first_rec_flag;      /*indicates if record is the first in the file       */
    long int FileType:        /*indicates the record type                          */
    FILE *fp;                 /*file containing all data to be imported/exported   */
}HAN;
```

FIG. 6

```
typedef struct                    250
{
    int FileType[6];          /*Same as FileType in FILENAMES                      */
    long int rec_num;         /*keeps track of which record we are on              */
    long int current_file;    /*keeps track of which file is currently being       */
                              /*processed                                          */
    FILE *object[5];          /*All processes are performed on these objects       */
    bool process_file[6]      /*process_file keeps track of whether the user       */
}                             /*wants to process the corresponding object          */
HAN;
```

FIG. 7

CFED_FormatName()

Function:
Returns a string indicating the name of file format that the DLL is able to read and write.

Calling Sequence:
  Display_name = CFED_FormatName();

| Variable | Data Type | Description |
| --- | --- | --- |
| Display_name | char* | Returns a char*, indicating the name of the file format the DLL is able to read and write. This name will be displayed on a menu. It is a good idea to include the version number of the DLL in the name. |

Example: ← 260

```
char* __stdcall CFED_FormatName()  ← 262
{
    return "Diebold PACE TLG 1.10";
}
```

FIG. 8

CFED_Version()

Function:
Returns a string indicating the version of the interface that the DLL conforms to. See the title page of this document for the interface version # which must be placed here.

Calling Sequence:
  version = CFED_Version();

| Variable | Data Type | Description |
| --- | --- | --- |
| version | char* | Returns a char*, indicating the version of the DLL. This document conforms to interface level 1.10 |

Example: ← 270

```
char* __stdcall CFED_Version()
{
    return 1.10;
}
```

FIG. 9

CFED_GetFileOrg()

Function:
Returns whether the records are in one or several files. The application will need this information so that it can allow the user to select the correct number of files for the DLL.

Calling Sequence:
    FileOrg = CFED_GetFileOrg();

| Variable | Data Type | Description |
|---|---|---|
| FileOrg | long int | Returns whether the records for the DLL are in several files or a single file.<br>0: single file<br>1: multiple files |

Example:       ← 280

```
long int __stdcall CFED_GetFileOrg()
    {
    return 0;  /*all records are in one file*/
    }
```

FIG. 10

CFED_Open()

Function:
This function opens the files that need to be opened to either read or write data. CFED_Open creates a user_handle of type HAN to keep track of the current state of the DLL. It returns the address of this user_handle...the application depends on receiving the address of this user_handle because it sends this address to later functions (CFED_DataRead, CFED_DataWrite, and CFED_Close). If an error occurs opening the file, the memory allocated to the user_handle is immediately freed and status is set to CFED_NO_FILE.

Note: Your DLL must support all file types defined in this call. This only means that your DLL must gracefully handle any record type sent to it. Your particular format can simply ignore any record types you do not wish to process.

Calling Sequence:
  user_handle = CFED_Open(Names, Function, status, recordmap);

Example: ← 290

```
long int __stdcall CFED_Open
(
    CFILENAMES   *Names,      /*structure that indicates FileType and FileName  */
    char         *Function,   /*indicates the function to be performed on the   */
                              /*file (read or write)                            */
                                                                                */
    long int     *status,     /*indicates the status of the function            */
    long int     recordmap    /*count of how many files will be processed       */
)
{
    long int     i;           /*dummy count variable                            */
    CFILENAMES   *ptr;        /*temporary pointer used to traverse an array of  */
                              /*structs                                         */
    HAN          *handle;     /*ptr to a HAN struct                             */

/*initialize handle*/
    handle = (HAN*)malloc(sizeof(HAN));
    If(handle == NULL)
        {
        *status = CFED_NO_MEM;
        return NULL;
        } for(i = 0; i<6; i++)
        {
        handle->process_file[i] = false;
        handle->object[i] = new DDFEFile;
        }
```

FIG. 11

```
/*Find number of elements in array*/                    ← 292
GetFileCount(Names, recordmap, handle);

for(ptr = Names, i = 0; i < 6 && *status==0; i++, ptr++)
    {
    handle->FileType[i] = ptr->FileType;
    if(handle->process_file[i])
                {
                handle->rec_num = 0;        /*initialize rec_num*/
                *status = Open_f(ptr, Function, (handle->object[i]));
                }
    } if(*status==0)     /*file was successfully opened*/
    {
    handle->current_file = 0;           /*set current file = 0  */
    /*make sure file 0 is supposed to be processed...if not    */
    /*set the current file to the first file that is to be     */
    /*processed                                                */
    for(i = 0; i<5 && !handle->process_file[i]; i++)
                if(handle->process_file[i+1])
                            handle->current_file = i+1;
    }
else /*open failed...free all allocated memory here*/
    {
    for(i=0; i<6; i++)
                delete handle->object[i];
    free(handle);
    return NULL;
    }
/*Return the memory address of handle so it can be used in later*/
/*functions*/
return (long int)handle;
}
```

| Variables | Data Type | Description |
|---|---|---|
| Names | CFILENAMES * | This structure is passed in as an array. The array contains the names of the required files as well as their file type. The element 'FileName', which is a char*, includes the full path of the file name. 'FileType' is a long integer indicating the file type. Possible values:<br>0: Single file (contains all records)<br>1: Screen file<br>2: State file<br>3: Misc. Config file<br>4: Terminal Type file<br>5: FIT file<br>8: Format Template file |
| Function | char* | This indicates whether CFED_Open() is to open the file(s) to read or write. There are two possible parameters:<br>"r": open for read<br>"w": open for write |
| status | long int* | This variable receives the status of the function.<br>Possible returns:<br>0: CFED_OK (successfully completed)<br>1: CFED_NO_FILE (file does not exist)<br>2: CFED_INVALID_FILE (Invalid File )<br>10: CFED_NO_MEM (Memory allocation failed)<br>See CFED.h for a complete list of return codes. |
| recordmap | long int | This is a bitmap indicating which record types should be processed.<br>1: Screen Records<br>2: State Records<br>4: Miscellaneous Configuration Records<br>8: FIT Records<br>16: Terminal Type recor ds<br>32: Format Template files |
| user_handle | long int | Memory address of the user_handle that keeps track of the currents status of the DLL |

FIG. 13

These are examples of what the parameters passed in might look like:

| Names 312 | Names.FileName | Names.FileType 310 |
|---|---|---|
| | C:\TTFD00.DA | 1 |
| | C:\TSFD00.DA | 2         ← 314 |
| | C:\MCFD00.DA | 3 |
| | C:\TLGD00.DA | 4 |
| | C:\FITD00.DA | 5 |
| | C:\FTF00.DA | 6 |
| Function | "r" | |
| RecordTypes | 0x1F | | or

| Names 322 | Names.FileName 320 | Names.FileType 324 |
|---|---|---|
| | C:\AllD00.DA | 0 |
| Function | "w" | |
| RecordTypes | 0x0C | |

FIG. 14

CFED_Close()

Function:
This function closes the open file(s). The CFED_Close() is passed the address of the user_handle that was used to keep track of the current state of the DLL. CFED_Close deallocates the memory used for this user_handle. CFED_Close() will not be called if CFED_Open() fails.

Calling Sequence:
  status = CFED_Close (user_handle);

| Variable | Data Type | Description |
|---|---|---|
| user_handle | long int | This is the address in memory to set a HAN pointer to. Once a HAN pointer has been set to point to this address it will have all the information it had from CFED_Open(). |
| status | long int | returns a value indicating whether or not the file(s) was actually closed. These are the possible values:<br>0: CFED_OK (Call was completed successfully)<br>3: CFED_FILE_NO_CLOSE (A file was not closed)<br>See CFED.h for a complete list of return codes. |

Example:

```
long int __stdcall CFED_Close
    (                                                              /* 350
    long int user_handle   /*address in memory of a HAN structure initialized   */
    )                      /*in CFED_Open()                                     */

{
bool files_closed;      /*flag to indicate whether all the files were   */
                        /*successfully closed                           */
int test;               /*flag to indicate whether each individual file was */
                        /*closed                                        */
int i;                  /*dummy counter variable                        */
HAN *handle_ptr;        /*pointer to a HAN structure. This will point to */
                        /*the memory address user_handle, which was received as */
                        /*a parameter in this function                  */ long int status;

files_closed = true;            /*initialize flag */
handle_ptr = (HAN*)user_handle;     /*make handle_ptr point to memory address
    */
    status = CFED_OK;           /*initialize status */
/*loop to close all files       */
For(i=0; i<6; i++)
    {
    test = fclose(handle_ptr->object[i]);
    if (test != 0)  /*not all files were able to be closed*/
        Files_closed = false;
    }
free (handle_ptr);  /*free allocations*/ if(!files_closed)
    {
    status = CFED_FILE_NO_CLOSE;
    }
return status;
}
```

FIG. 15

CFED_DataRead()

Function:
Reads ATM configuration data from the open file(s). This function reads in and passes back a single record, therefore the function will be called once (by the application) for every record in a file. When the file is empty CFED_DataRead returns a EOF. For formats composed of several files, all of the records in all of the files must be returned before an EOF is returned.

Calling Sequence:
    Status = CFED_DataRead(RecordType, user_handle, LoadGroup, Number, Data, Comment);

Example: ← 360

```
long int __stdcall CFED_DataRead
    (
    long int *RecordType,      /*indicates current record's type                      */
    long int user_handle,      /*memory address of HAN struct initialized             */
                               /*in CFED_Open()                                       */
    char    *LoadGroup,        /*LoadGroup will be read into this variable            */
    char    *Number,           /*Number will be read into this variable               */
    char    *Data,             /*Data will be read into this variable                 */
    char    *Comment           /*Comment is not used by the PACE format               */
    )
    {
    HAN *handle_ptr;           /*HAN struct pointer that will point to the   */
                               /*memory address user_handle                  */
    long int status;           /*status variable*/
    bool EndReading;                    /*flag to indicate when EOF is reached*/
    int i;                     /*dummy counter variable*/
    int j;                     /*dummy counter variable*/
    Comment[0] = '\0';
    status = CFED_OK;
    EndReading = true;
    handle_ptr = (HAN*)user_handle;
    /*check if all files have reached EOF*/
    for(i=0; i<6; i++)
        {
        if(handle_ptr->process_file[i]==true)
                EndReading=false;     /*if any of the process_file flags are true  */
        }                             /*then we haven't reached EOF yet            */ if (EndReading == true)
        {       /*if we have reached EOF, reset all file process flags  */
                /*for the next process                                  */
        for(j=0; j<6; j++)
            handle_ptr->process_file[j]=true;
        status = CFED_EOF;
        } else    /*read file*/
        }
        *RecordType = handle_ptr->FileType[handle_ptr->current_file];
        fread (LoadGroup, 4, 1, handle_ptr->object[handle_ptr->current-file]);
        LoadGroup [4] = '\0' ;
        fread(number, 3, 1, handle-ptr->object [handle_ptr->current_file]);
        Number [3] = '\0' ;
/* Note to the reader...you will have to have some way to find out how long each record  */
/* is so that you can know how many bytes to read into the Data and Comment fields.      */
/* In this sample code, Dlength represents the length of the Data field and Clength      */
/* represents the length of the Comment field.                                           */
        fread(Data, Dlength, 1, handle_ptr->object[handle->ptr->current_file]);
            Data [Dlength] = '\0' ;
      fread(Comment, Clength, 1, handle_ptr->object[handle-ptr->current_file]);
            Comment [Clength] = '\0';
        }
return status;
}
```

FIG. 16

| Variables | Data Type | Description |
|---|---|---|
| RecordType | long int * | This indicates the record type of the current record. Possible values:<br>1: Screen record<br>2: State record<br>3: Misc. Config. record<br>4: Terminal Type record<br>5: FIT record<br>8: Format Template record |
| user_handle | long int | Keeps track of the current state of the DLL. |
| LoadGroup | char* | four-character value, which specifies the configuration load group the record is associated with.<br>If there is no load group the parameter can be ignored. |
| Number | char* | This is a three-byte string indicating the record number. |
| Data | char* | A string that contains the data portion of the record. |
| Comment | char* | A string that contains the comment portion of the record. |
| Status | long int | Returns a value indicating whether or not the function has been completed successfully. There are three possible returns:<br>0: CFED_OK (Call was completed successfully)<br>4: CFED_READ_ERROR (Read error)<br>5: CFED_EOF: end of file<br>See CFED.h for a complete list of return codes. |

Where Space for Data is Allocated:
The application allocates 5 bytes of space for the load group field (including trailing string terminating character, so load group has a maximum of 4 bytes), 4 bytes of space for the number field (also including trailing string termination character, so number has a maximum of 3 bytes), 4096 bytes of space for the data field, and 4096 bytes of space for the comment field. There is no need to allocate memory for these variables.

FIG. 17

CFED_DataWrite():

Function:
Writes ATM configuration data to a file(s) or database. This function receives a single record every time it is called. Therefore, the application will call CFED_DataWrite once for every record.

Calling Sequence:
    status = CFED_DataWrite (RecordType, user_handle, LoadGroup, Number, Data, Comment);

Example: ← 400

```
long int __stdcall CFED_DataWrite
    (
    long int    RecordType,     /*indicates the type of current record         */
    long int    user_handle,    /*memory address of a HAN struct               */
    char        *LoadGroup,     /*LoadGroup to be written                      */
    char        *Number,        /*Number to be written                         */
    char        *Data,          /*Data to be written                           */
    char        *Comment        /*Comment is not used by the PACE format       */
    )
    {
    /*set handle_ptr to point to memory address user_handle*/
    HAN *handle_ptr = (HAN*)user_handle;
    long int status;         /*initialize status*/
    bool EndWriting;         /*initialize Endreading*/
    int i;
    int Clength;
    int Dlength;

EndWriting = true;
    status = CFED_OK;
    /*check if all files have reached EOF*/
    for(i=0; i<6; i++)
        {
        if(handle_ptr->process_file[i]==true)
            EndWriting=false;
        }
    if (EndWriting == true)
        {
        for(i=0; i<6; i++)
            handle_ptr->process_file[i]=true;

status = CFED_EOF;
        }
    else         /*write file*/
        {
        fwrite(LoadGroup, 4, 1, handle_ptr->object[handle_ptr->current_file]);
        fwrite(Number, 3, 1, handle_ptr->object[handle_ptr->current_file]);
        Dlength = strlen(Data);
        fwrite(Data, Dlength, 1, handle_ptr->object[handle_ptr->current_file]);
        Clength = strlen(Comment);
     fwrite(Comment, Clength, 1, handle_ptr->object[handle_ptr->current_file]);
        }
    return status;
    }
```

FIG. 20

| Variables | Data Type | Description |
|---|---|---|
| RecordType | long int | This indicates the record type of the current record being written There are four possible values:<br>1: Screen record<br>2: State record<br>3: Misc. Config. record<br>4: Terminal Type record<br>5: FIT record<br>8: Format Template record |
| user_handle | long int | This is the memory address of the HAN user handle which keeps track of the current state of the DLL. |
| LoadGroup | char* | four-character value, which specifies the configuration load group the record is associated with.<br>Valid Data Range: 0 though 9 (30h though 39h), A through Z (41h though 5Ah) and a through z (61h though 7Ah) |
| Number | char* | This is a three-byte string indicating the record number. |
| Data | char* | A string that contains the data portion of the record. |
| Comment | char* | A string that contains the comment portion of the record. |
| status | long int | Status: Returns a value indicating whether or not the function was completed successfully. There are three possible returns:<br>0: CFED_OK (Call was completed successfully)<br>6: CFED_WRITE_ERROR (Unable to write record)<br>See CFED.h for a complete list of return codes. |

FIG. 21

Fit Record

| Variable | Field Name | Field Size (bytes) | Variable Type |
|---|---|---|---|
| LoadGroup | Load Group | 4 | ASCII |
| Number | FIT Number | 3 | ASCII |
| Data | Institution Index | 4 | ASCII |
| | Institution Identifier | 3 | ASCII |
| | Indirect Next State Index | 3 | ASCII |
| | ALGO Number Index | 15 | ASCII |
| | Maximum PIN Entry Digits | 3 | ASCII |
| | PIN-check Length | 3 | ASCII |
| | PIN Pad Character | 3 | ASCII |
| | PAN Index | 3 | ASCII |
| | PAN Length | 3 | ASCII |
| | PAN Pad Character | 3 | ASCII |
| | PIN Retry Count Index | 3 | ASCII |
| | Offset Number Index | 3 | ASCII |
| | Decimalization Table | 24 | ASCII |
| | Encrypted PIN Key | 24 | ASCII |
| | Data Track Locator | 9 | ASCII |
| | Reserved | 9 | ASCII |
| Comment | Comment | Variable  MAX 80 | ASCII |

FIG. 22

Timer Record

| Variable | Field Name | Field Size (bytes) | Variable Type |
|---|---|---|---|
| LoadGroup | Load Group | 4 | ASCII |
| Number | Miscellaneous Configuration Record Number | 3 | ASCII |
| Data | Depository Printer/Camera | 1 | Decimal ASCII |
| | Control | 3 | Decimal ASCII |
| | Card Read Error Count | 3 | Decimal ASCII |
| | High-side Bill Size | 3 | Decimal ASCII |
| | Low-side Bill Size | 3 | Decimal ASCII |
| | Track 3 Error Count | 3 | Decimal ASCII |
| | Miscellaneous Features 1 | 3 | Decimal ASCII |
| | Reserved | 3 | Decimal ASCII |
| | Miscellaneous Features 2 | 3 | Decimal ASCII |
| | Reserved | 3 | Decimal ASCII |
| | Reserved | 3 | Decimal ASCII |
| | Miscellaneous Features 3 | 3 | Decimal ASCII |
| | Miscellaneous Features 4 | 1 | ASCII |
| | Field Separator | 3 | Decimal ASCII |
| | LUNO | 1 | ASCII |
| | Field Separator | 2 | Decimal ASCII |
| | Timer Number(1) | 3 | Decimal ASCII |
| | Timer Limit(1) | 2 | Decimal ASCII |
| | Timer Number(2) | 3 | Decimal ASCII |
| | Timer Limit(2) | 2 | Decimal ASCII |
| | Timer Number(3) | 3 | Decimal ASCII |
| | Timer Limit(3) | 2 | Decimal ASCII |
| | Timer Number(n) | 3 | Decimal ASCII |
| | Timer Limit(n) | | |
| Comment | Comment | Variable    Max 80 | ASCII |

FIG. 23

| Screen Record | | | |
|---|---|---|---|
| Variable | Field Name | Field Size (bytes) | Variable Type |
| LoadGroup | Load Group | 4 | ASCII |
| Number | Screen Number | 3 | ASCII |
| Data | Screen Data | Variable  MAX 1920 | ASCII |
| Comment | Comment | Variable  MAX 80 | ASCII |

FIG. 24

| State Record | | | |
|---|---|---|---|
| Variable | Field Name | Field Size (bytes) | Variable Type |
| LoadGroup | Load Group | 4 | ASCII |
| Number | State Number | 3 | ASCII |
| Data | State Type<br>State Data | Variable (1 or 3)<br>+ Variable = MAX 255 | ASCII<br>ASCII |
| Comment | Comment | Variable  MAX 80 | ASCII |

FIG. 25

| Terminal Type Record | | | |
|---|---|---|---|
| Variable | Field Name | Field Size (bytes) | Variable Type |
| LoadGroup | Not used | 0 | ASCII |
| Number | Not Used | 0 | ASCII |
| Data | Terminal Type<br>Record Type *<br>LoadGroups | 8<br>1<br>4 bytes each; this supports up to 20 LoadGroups (80 bytes). This field must be padded with binary 0s if it isnt filled with LoadGroups | ASCII<br>ASCII<br>ASCII |
| Comment | Comment | Variable - MAX 80 | ASCII |

*Record type:
  1 == Screen
  2 == State
  3 == Timer
  5 == FIT
  8 == Format Template

FIG. 26

| Format Template Record | | | |
|---|---|---|---|
| Variable | Field Name | Field Size (bytes) | Variable Type |
| LoadGroup | Load Group | 4 | ASCII |
| Number | Template Number | 3 | ASCII |
| Data | Format template definition data | 0 - 99 bytes | ASCII |
| Comment | Comment | Variable - MAX 80 | ASCII |

FIG. 27

METHOD OF UPDATING A CONFIGURATION EDITING SYSTEM FOR GENERATING CONFIGURATION DATA FOR AN AUTOMATED BANKING MACHINE

CROSS REFERENCE TO RELATED APPLICATIONS

This application claims benefit of U.S. Provisional Application Ser. No. 60/479,287 filed Jun. 17, 2003.

TECHNICAL FIELD

This invention relates to automated banking machines. Specifically, this invention relates to programming automated banking machines and a method of updating a configuration editing system for generating configuration data for an automated banking machine.

BACKGROUND ART

Automated banking machines are well known. A common type of automated banking machine used by consumers is an automated teller machine ("ATM"). ATMs enable customers to carry out banking transactions. Common banking transactions that may be carried out with ATMs include the dispensing of cash, the making of deposits, the transfer of funds between accounts, the payment of bills and account balance inquiries. The types of banking transactions a customer can carry out are determined by the capabilities of the particular banking machine and the programming of the institution operating the machine. Other types of automated banking machines may allow customers to charge against accounts or to transfer funds. Other types of automated banking machines may print or dispense items of value such as coupons, tickets, wagering slips, vouchers, checks, food stamps, money orders, scrip or traveler's checks. For purposes of this disclosure an ATM, an automated banking machine, or an automated transaction machine shall encompass any device which carries out transactions including transfers of value.

ATMs may be operative to output a plurality of user interface screens through a display device of the ATM. Such user interfaces may include text, graphics, and other user interface objects which provide interactive menus for operating the ATM. The user interfaces may further include advertising or promotional messages and other visual or audible outputs. ATMs may be used with external configuration editing systems and mechanisms which enable an owner and/or operator of the ATM to customize the user interfaces provided by the ATM. Such configuration editing systems may enable the owner and/or operator of the ATM to change the user interface screens and other configuration parameters of the ATM.

The level of configurability of the ATM is often limited to the specific set of features which are allowed to be customized by the configuration editing systems provided for the ATM by the ATM manufacturer. Such customizations may include changing the appearance of the ATM user interface screens, changing states through which the user interface of the ATM progresses, changing timers, and changing the Financial Institution Table (FIT) information. Unfortunately, the owner and/or operator of the ATM is often forced to live with the initial level of configurability of an ATM until such time as the manufacturer of the ATM releases an updated version of the ATM configuration editing software. The time between releases of ATM configuration editing software by the manufacture of the ATM may be several months or longer. Consequently, there exists a need for a method of updating configuration editing software for use with an ATM, which enables the configuration editing software to be updated or customized to suit the specific needs of the owner and/or operator of the ATM.

DISCLOSURE OF INVENTION

It is an object of an exemplary form of the present invention to provide a method for editing a configuration of an automated banking machine.

It is an object of an exemplary form of the present invention to provide a method for providing additional configuration capabilities for an automated banking machine.

It is an object of an exemplary form of the present invention to provide a method for updating configuration editing software for use with an automated banking machine.

Further objects of exemplary forms of the present invention will be made apparent in the following Best Modes for Carrying Out Invention and the appended claims.

The foregoing objects may be accomplished in an exemplary embodiment through use of an automated banking machine such as an automated teller machine (ATM), which includes output devices such as a display screen and receipt printer. The machine may further include input devices such as a touch screen, keyboard, keypad, function keys and a card reader. The ATM may further include transaction function devices, such as a cash dispenser mechanism for sheets of currency, a depository mechanism and other transaction function devices which are used by the machine in carrying out banking transactions including transfers of value. In the exemplary embodiment the ATM may include at least one computer. The computer may be in operative connection with the output devices and the input devices, as well as with the cash dispenser mechanism, depository mechanism and other physical transaction function devices in the banking machine. The computer may further be operative to communicate with a host system located remotely from the machine.

In the exemplary embodiment, the computer may include software components that are executable therein. The software components of the ATM may be operative to cause the computer to output user interface screens through a display device of the machine. The user interface screens may include consumer screens, which provide a consumer with information for performing consumer operations, such as banking functions with the machine. The user interface screens may further include service screens which provide an authorized user servicing the machine with information for performing service and maintenance operations with the machine. In addition, the machine may include software components operative in the computer for controlling and communicating with hardware devices of the machine, including the input devices, output devices and the transaction function devices.

An exemplary embodiment of the ATM may include a terminal control software application comprised of one or more software components that are executable in the computer of the ATM. The terminal control software may operate responsive to ATM configuration data. Such ATM configuration data may be received by the ATM from a remote system, such as an ATM host banking system or other system in operative connection with the ATM. A consumer's interaction with the ATM may be determined by the ATM configuration data at the ATM. Configuration data may include user interface screen data which specify the appearance of the visual outputs displayed to the consumer. Configuration data may further include state data which specify the individual steps or states that the ATM should progress through during operations with the ATM. Also, configuration data may include financial institution table (FIT) files, timers, terminal parameters, format templates and terminal type records.

ATM configuration data may be generated and modified using an ATM configuration editor software application. The ATM configuration editor software application may be executed on a computer system remote from the ATM, and the ATM configuration data generated may be sent to the ATM through an ATM host banking system or other remote system for example.

An exemplary embodiment of the configuration editor is operative to use dynamically loadable import/export software libraries such as DLLs in a Microsoft Windows Operating System environment. Such libraries are referred to herein as ATM configuration editor DLLs and are operative to provide functions for reformatting data used with the configuration editor software application. The exemplary embodiment of the ATM configuration editor is operative to support the use of new ATM configuration editor DLLs, which are created after the release of the ATM configuration editor. Such new configuration editor DLLs may be programmed according to a plurality of programming steps, without a programmer needing to have a detailed understanding of the ATM configuration editor.

An ATM configuration editor DLL may correspond to a software program which converts information from an external or custom format, which cannot be directly understood by the configuration editor, into an internal or standard format, which is understandable by the configuration editor. The ATM configuration editor DLL may also convert the information in the opposite direction. Thus, when information in the internal format is modified by the ATM configuration editor, the ATM configuration editor DLL may be used to convert the modified information to the external format for use by an application which requires the external format. Examples of applications which use different external formats for ATM configuration data include systems such as Diebold® iConnect™, Diebold® Pace™, and Mosaic Postilion™.

In an exemplary embodiment, when the ATM configuration editor is initially started or at other times, the configuration editor may be operative to search for existing ATM configuration editor DLLs. Such ATM configuration editor DLLs may be located in one or more specified directories or other data stores which the ATM configuration editor is operative to search. The ATM configuration editor may be operative to display to a user of the ATM configuration editor, a listing of items which correspond to the ATM configuration editor DLLs. The ATM configuration editor may enable the user to select an item from the listing which corresponds to a desired ATM configuration editor DLL. The ATM configuration editor may be responsive to the selection, to dynamically load the ATM configuration editor DLL and resolve the entry point addresses of the DLL. In an exemplary embodiment, the method may include generating the ATM configuration editor DLLs with the same defined entry points. These may include the entry points of Open, Read and Write for example. Data in the internal format is passed from the ATM configuration editor to the ATM configuration editor DLL using the Write function, where it is converted to an external format. The reverse conversion occurs when the ATM configuration editor calls the Read function, where data in the external format is converted to the internal format and is returned to the ATM configuration editor.

An exemplary embodiment for creating a new configuration editor DLL may be comprised of a plurality of steps. These may include generating software code for the DLL which includes a first function capable of returning a description of an ATM configuration data format. In addition, the steps may include generating software code for the DLL which includes a second function capable of reading at least one ATM configuration data record from the at least one file. Further, the steps may include generating software code for the DLL which includes a third function capable of writing at least one ATM configuration record to the at least one file. In addition to these steps, the method may include generation software code for the DLL which includes a fourth function capable of opening at least one file that comprises at least one ATM configuration data record, and generating code for the DLL which includes a fifth function capable of closing the at least one file.

BRIEF DESCRIPTION OF DRAWINGS

FIG. 4 shows an exemplary embodiment of a header file for use in generating a configuration editor DLL.

FIG. 5 shows a listing of entry points generated for an exemplary embodiment of a configuration editor DLL.

FIG. 6 shows an example of a user handle for a single data format.

FIG. 7 shows an example of a user handle for a multiple data format.

FIG. 8 shows an example of the programming code created for the CFED_FormatName( ) function of a configuration editor DLL.

FIG. 9 shows an example of the programming code created for the CFED_Version( ) function of a configuration editor DLL.

FIG. 10 shows an example of the programming code created for the CFED_GetFile_Org( ) function of a configuration editor DLL.

FIGS. 11 and 12 show an example of the programming code created for the Open( ) function of a configuration editor DLL.

FIG. 13 shows a chart of the arguments that are passed to the CFED_Open( ) function of a configuration editor DLL.

FIG. 14 shows tables which include examples of possible values for the arguments passed to the CFED_Open( ) function.

FIG. 15 shows an example of the programming code created for the CFED_Close( ) function of a configuration editor DLL.

FIG. 16 shows an example of the programming code created for the CFED_DataRead( ) function of a configuration editor DLL.

FIG. 17 shows a table which lists variables associated with the CFED_DataRead( ) function.

FIG. 20 shows an example of the programming code created for the CFED_DataWrite( ) function of a configuration editor DLL.

FIG. 21 shows a table which lists the variables associated with the CFED_DataWrite( ) function.

FIGS. 22–27 show values of variables that are expected to be received by the configuration editor software from the configuration editor DLLs.

BEST MODES FOR CARRYING OUT INVENTION

Figure 1:
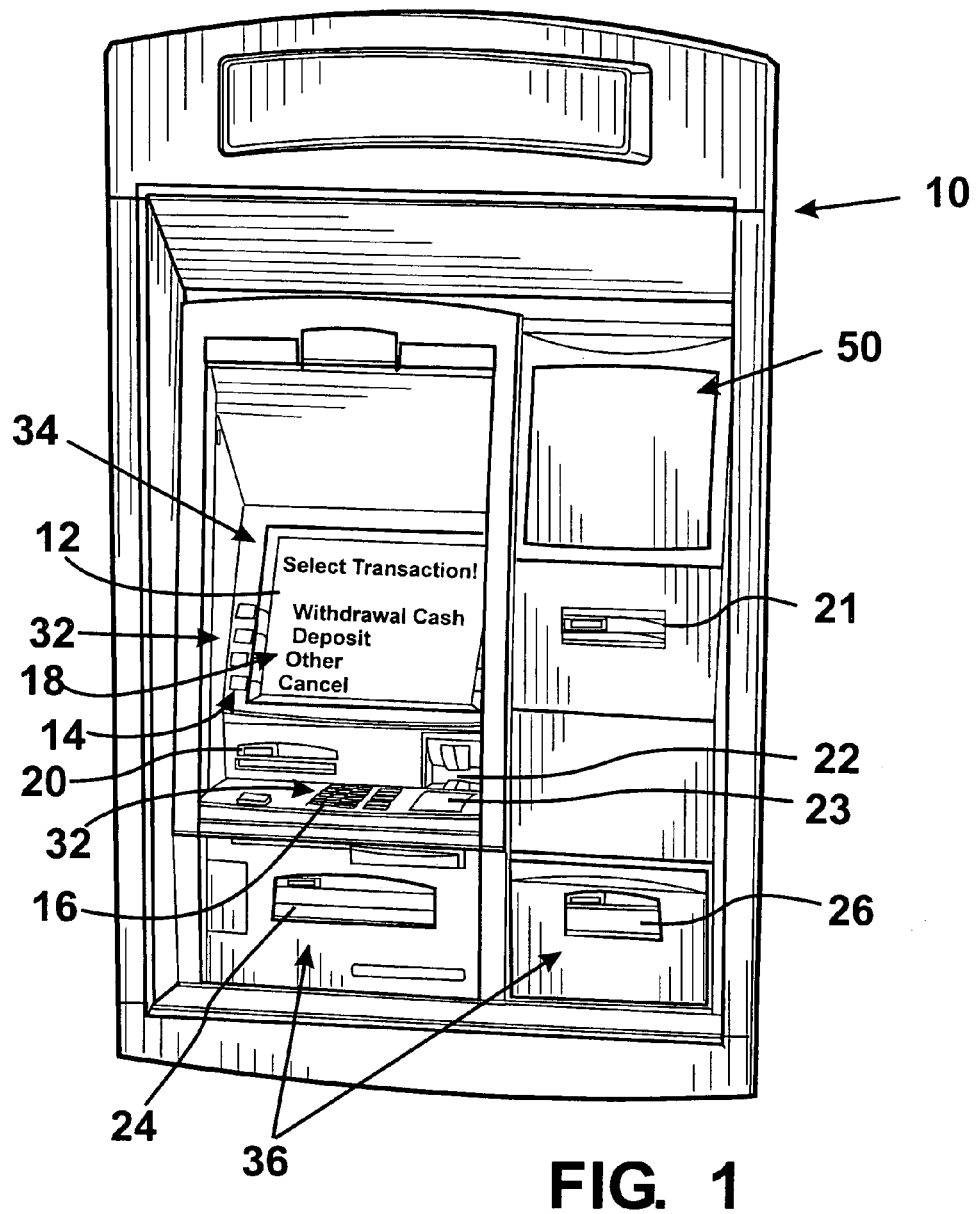
FIG. 1 is a perspective view representative of an exemplary embodiment of an automated banking machine.

Referring now to the drawings, and particularly to FIG. 1, there is shown therein a perspective view of an exemplary embodiment of an automated banking machine 10. Here the automated banking machine 10 may include at least one output device 34 such as a display device 12. The output device 12 may be operative to provide a consumer with a user interface 18 that may include a plurality of screens or other outputs, including selectable options for operating the machine. The exemplary embodiment may further include other types of output devices, such as a receipt printer 20, statement printer 21, speakers or any other type of device that is capable of outputting visual, audible or other sensory perceptible information.

The exemplary embodiment of the automated banking machine 10 may include a plurality of input devices 32, such as an encrypting pin pad (EPP) with keypad 16 and function keys 14, as well as a card reader 22 and/or bar code reader 23. The exemplary embodiment of the machine 10 may further include or use other types of input devices, such as a touch screen, microphone or any other device that is operative to provide the machine with inputs representative of user instructions or information. The machine may also include one or more biometric input devices, such as a fingerprint scanner, an iris scanner, facial recognition device, hand scanner or any other biometric reading device which may be used to read a biometric input that can be used to identify a user.

The exemplary embodiment of the automated banking machine 10 may further include a plurality of transaction function devices, which may include, for example, a cash dispenser 24, a depository mechanism 26, a cash recycler mechanism or any other type of device which is operative to perform transaction functions involving transfers of value.

Figure 2:
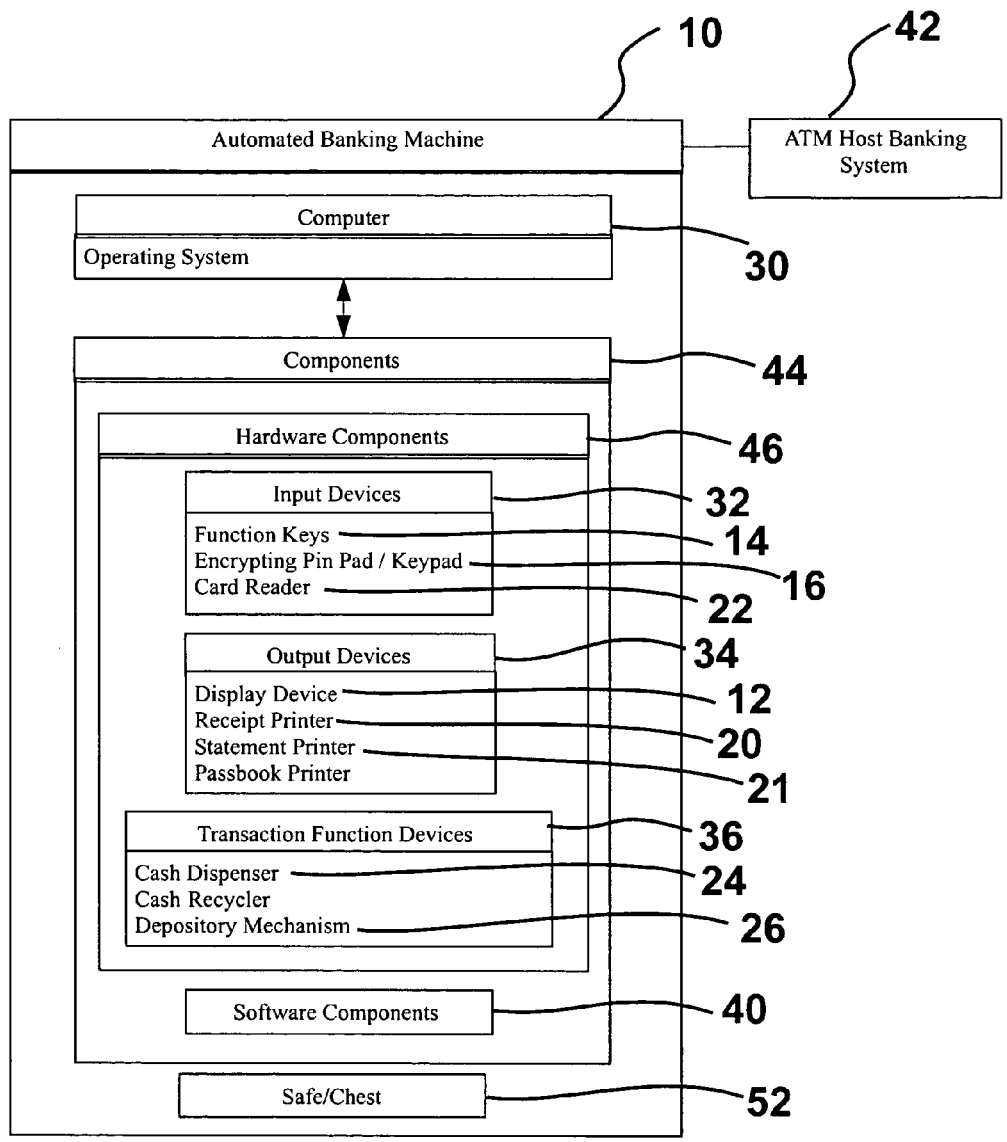
FIG. 2 is a schematic view of an exemplary embodiment of an automated banking machine.

FIG. 2 shows a schematic view of components which may be included or may be in communication with the automated banking machine 10. Exemplary embodiments of the automated banking machine 10 may be operative to communicate with a transaction processing server which is referred to herein as an ATM host banking system 42. Such an ATM host banking system 42 may be operative to authorize the automated banking machine 10 to perform transaction functions for users, such as withdrawing cash from an account through operation of the cash dispenser 24, depositing checks or other items with the depository mechanism 26, performing a balance inquiry for a financial account and transferring value between accounts. An ATM host banking system may also include software adapted to send ATM configuration data to a plurality of different ATMs.

The automated banking machine 10 may include at least one computer 30. The computer 30 may be in operative connection with a plurality of components 44. Such components may include both hardware devices 46 and software components 40. The hardware devices 46 may correspond to the previously described input device(s) 32, output device(s) 34 and transaction function device(s) 36. In an exemplary embodiment, a transaction function device may be operative to perform a transaction function in response to at least one input through at least one of the input devices.

In exemplary embodiments the machine may include a secure chest or safe 52. Portable articles, such as cash, notes, bills, checks, deposits or other items of value may be stored in the chest. In addition, in exemplary embodiments portions of the computer 30 may be housed in the safe, such as the mother board, processor, RAM, CD-ROM drive, floppy disk drive and hard drive components of the computer 30. In further exemplary embodiments, the computer 30 may be housed outside the chest 52.

In an exemplary embodiment, the software components may correspond to one or more terminal control software components that are operative in the computer 30. The terminal control software components may be operative to control the operation of the machine by both a consumer and an authorized user, such as a service technician. For example, such terminal control software components may include applications which enable a consumer to dispense cash, deposit a check or perform other transaction functions with the machine. In addition, the terminal control software components may include applications which enable a service technician to perform configuration, maintenance and diagnostic functions with the machine.

In exemplary embodiments of the machine, the previously described computer 30 and hardware components 46 may be mounted within an enclosure. Such an enclosure may include a frame. The computer and components of the machine may be securely mounted to the frame. As shown in FIG. 1, the machine may include a fascia 50 which provides access to one or more of the hardware components by a user of the machine, and also conceals the internal components of the machine and the frame from the view of a consumer.

Figure 3:
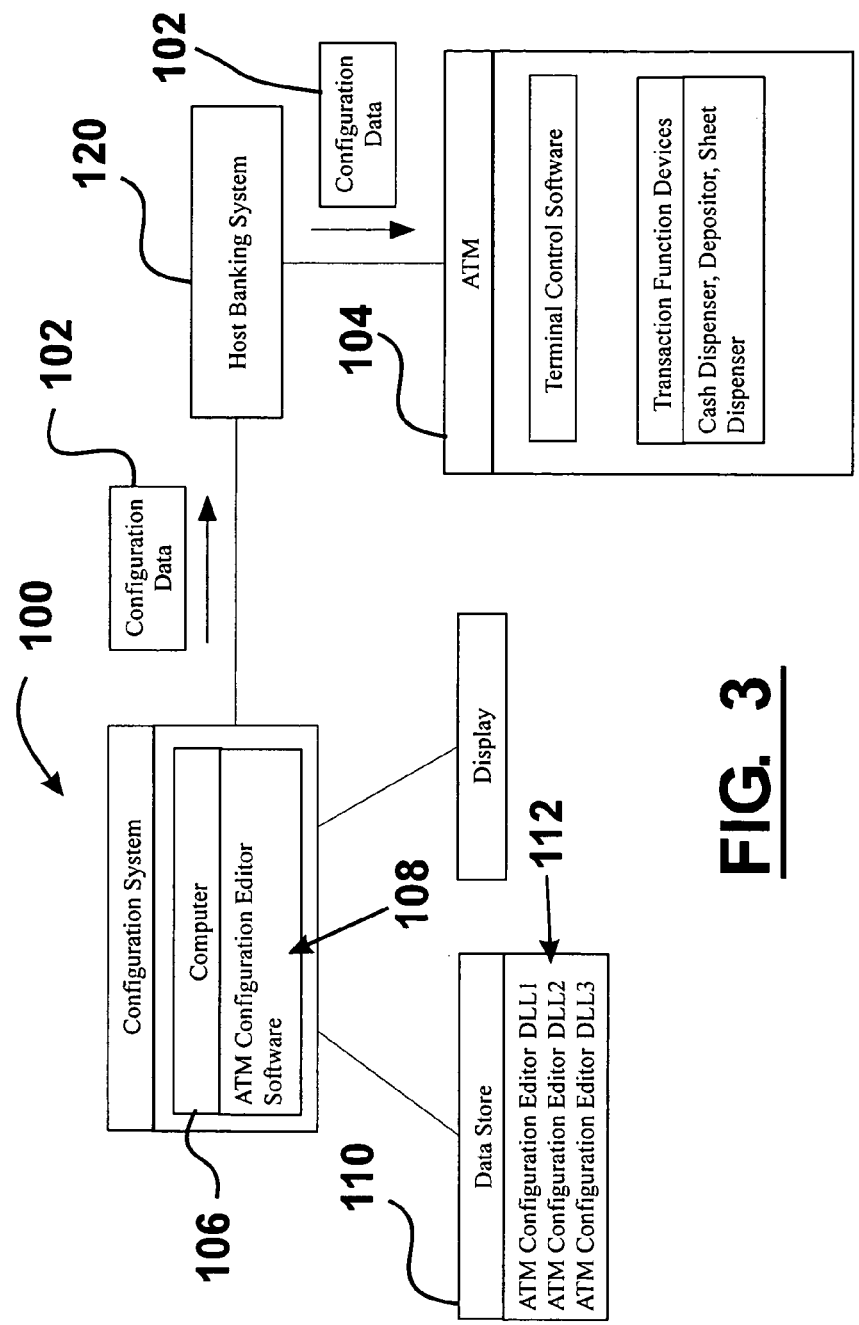
FIG. 3 is a schematic view of an exemplary embodiment of an ATM configuration editor.

FIG. 3 shows a schematic view of an exemplary embodiment of an ATM configuration editor system 100 for use with generating configuration data 102 used by one or more automated banking machines or ATMs 104. In this described exemplary embodiment, the configuration editor system 100 may include an ATM configuration editing software application 108 running on a computer 106 that is remote from the ATM 104. The type of ATM configuration data generated by the configuration editing software 108, may include screen records, state records, financial institution table (FIT) records, miscellaneous configuration (MFC) records, format template records and terminal type records, and/or other types of records which may be used for configuring an ATM.

Once generated, such configuration data 102 may be delivered to the ATM 104 through a host banking system 120, or other system that is in operative connection with the ATM 104. The configuration data once loaded and stored in memory of the ATM is operative to establish certain aspects of how the one or more computers in the ATM cause the ATM to operate in response to user inputs.

In the exemplary embodiment, screen record data may include terminal text records. The terminal text records may provide alphanumeric text, which is downloaded and displayed as part of user interface screens at the ATM. The state record data includes information which describes a terminal state which may be identified by a state number. The FIT record data may include an FIT file, which contains one or more records for each institution sharing an ATM. An institution may have more than one FIT record if it uses more than one institution identifier or more than one track format. The miscellaneous configuration record data may include, for example, terminal parameters and timers that are downloaded to the ATM in messages, such as in a Diebold 91X write command 3 message. The format template record data may include records which are referenced within screen records to control the way in which the consumer input or buffer contents are displayed. Each terminal format template record may include the information which describes a format template, which is identified by a template number. The terminal type record data may be used to specify which load groups should be sent to a particular type of terminal and may be used when a single file may contain data for many ATM terminals. A terminal type record may include an arbitrary name, along with a list of the load groups which are appropriate for this type of terminal. Each terminal type record may include the information to describe one terminal type, which is identified by the terminal type name.

The exemplary embodiment of the configuration editor software 108 is operative responsive to user inputs to the computer in which the software operates to both generate new configuration data records and update or modify existing configuration data records. The configuration editor software may be operative to read in external or custom format configuration data records and convert them to an internal or standard format which may be manipulated by the configuration editor. Also, the configuration editor may convert configuration data records in the internal format data to the external format.

In an exemplary embodiment, the configuration system 100 may include one or more data stores 110, which store a plurality of ATM configuration editor DLLs 112. The data store may include a file system directory, for example. In other exemplary embodiments, the data store may include other types of data stores, including a local or remote database.

Each configuration editor DLL may provide one or more software functions for performing the conversion of the configuration data between the internal and external formats. In an exemplary embodiment, each configuration editor DLL is operative for use with a particular type or set of external format configuration data records. However, it is to be understood that in alternative exemplary embodiments, each DLL may be operative to convert more than one type or version of external format configuration data records.

Figure 28:
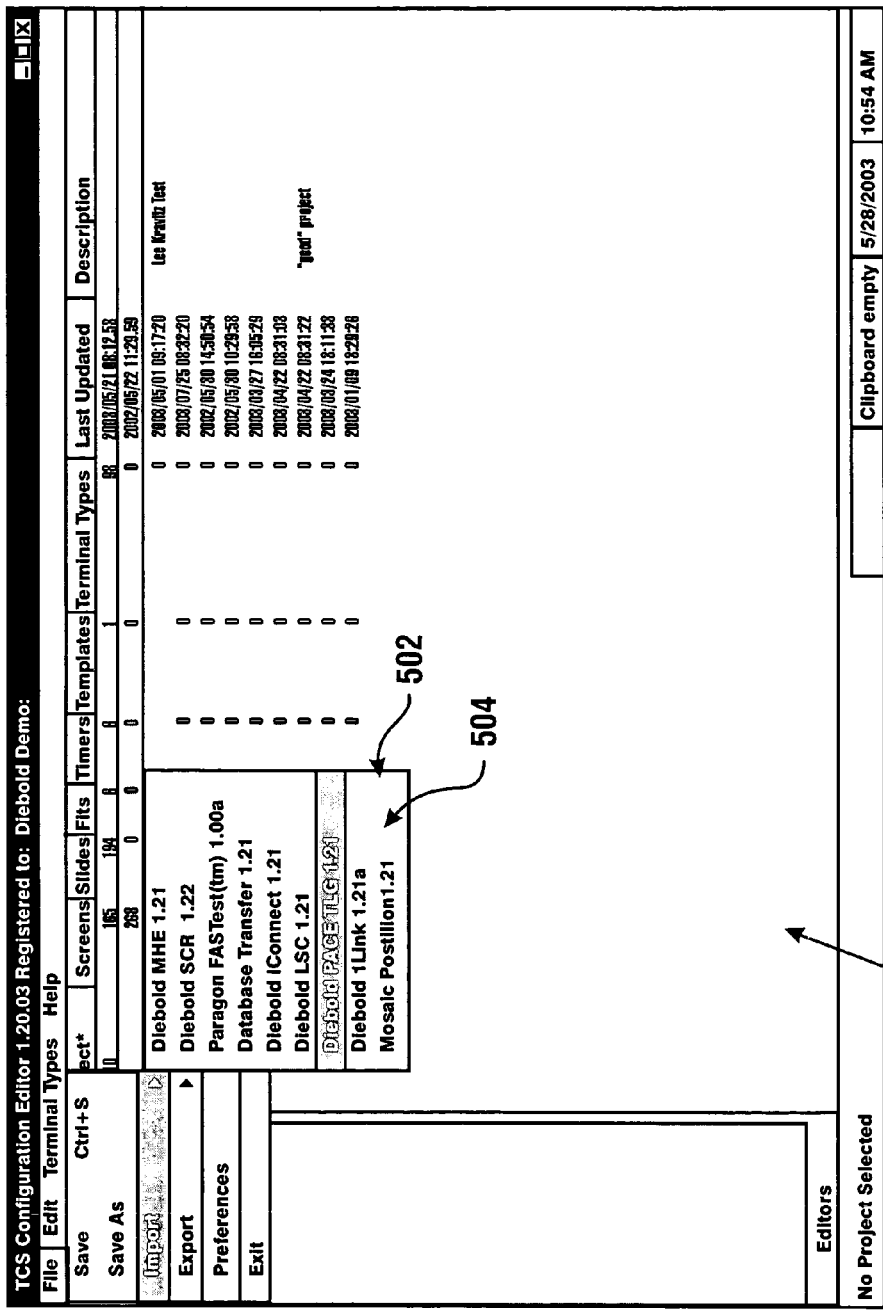
FIG. 28 shows an example of a user interface for an ATM configuration editor software application.

The exemplary embodiment of the configuration editor is operative to automatically recognize and provide for use by a user, any new configuration editor DLLs 112 which are added to the data store 110 of configuration editor DLLs. FIG. 28 shows an example of a user interface 500 for an ATM configuration editor software application. The user interface is shown with an import menu item 502 opened for selecting the type of external configuration records to import (read). Each of the items 504 listed in the menu correspond to one of the configuration editor DLLs available for use by the configuration editor software. In this described exemplary embodiment, the menu 502 is dynamically populated with items 504 based on the configuration editor DLLs found in a known data store such as a file directory. When additional DLLs are added to the file directory, the exemplary embodiment of the configuration editor software is operative to add new items to the menu 502, which correspond to the new DLLs.

In this described exemplary embodiment, configuration editor software may include separate menus for importing (reading) and exporting (writing) ATM configuration data records. Each menu may be dynamically populated, based on the configuration editor DLLs found in the specified configuration editor directory or other data store.

For a configuration editor DLL to be automatically usable by the configuration editor, the DLL is generated or programmed according to an exemplary embodiment of a method for generating configuration editor DLLs. The method includes a plurality of programming steps and guidelines which apply to each new DLL, which is independent of the format of the data being converted.

For example in an exemplary embodiment, the method may include generating DLLs with file names which conform to a uniform naming convention. This naming convention may include, for example, providing a uniform prefix or other sub part of the name of the file which specifies that the DLL is a configuration editor DLL for use with a configuration editor software application for ATM data. In this described exemplary embodiment, the DLLs may include a prefix of "CFED", which corresponds to an abbreviation for the configuration editor. However, in other exemplary embodiments, the names of the DLLs may include other naming conventions for associating the DLLs with the configuration editor software.

In this described exemplary embodiment, after the prefix of CFED, the DLL name includes an underscore and then a name which described the external format of the data which the DLL is capable of reading and writing. For example, a format conversion DLL may be named: "CFED_PACE.DLL". Here, the name "PACE" between the underscore "_" and the period "." of the DLL name indicates that the DLL is operative for use with converting data in a DIEBOLD PACE format to data in the internal or standard format of the ATM configuration editor software.

In an exemplary embodiment, the described exemplary method may include programming the functions of the configuration editor DLL to use the "_stdcall" calling convention and a four byte alignment. Also, the method of generating the configuration editor DLLs may include using a standard set of error return codes and at least one data structure. FIG. 4 shows an example of the contents of the common header file "CFED.h", which may be used for programming each configuration editor DLL. Here the header file 200 specifically defines return codes 202, which correspond to specific types of error codes that the DLL may return to the configuration editor software. In addition, the exemplary embodiment of the header file 200 specifies a structure 204 which is used by one or more functions of the DLL. In this described exemplary embodiment, the structure is named CFILENAMES and includes the variables filename and a file type.

Exemplary embodiments of the method include programming a common set of entry points for each configuration editor DLL. For the described exemplary embodiment, each configuration editor DLL includes the entry points shown in FIG. 5. Here the entry points 220 correspond to the functions named: CFED_FormatName( ), CFED_Version( ), CFED_GetFileOrg( ), CFED_Open, CFED_Close, CFED_DataRead( ), and CFED_DataWrite( ). In this described example, each entry point includes a function with the prefix "CFED_" followed by a more descriptive name of the function. Although for the described exemplary embodiment, the method includes generating DLLs with these exact entry point names, it is to be understood that in other alternative exemplary embodiments of the configuration editor, other naming conventions and/or functions names may be used for the entry points of the configuration editor DLLs. In the following description of these functions, these names will be used. However, for alternative exemplary embodiments, other function names may be used which provide similar functionality as described herein.

In this described exemplary embodiment, the method may include programming the configuration editor DLL to include the function named CFED_FormatName( ). The CFED_FormatName( ) function corresponds to a format name retrieval function, which is operative when called to return to the calling program a string which indicates the type or name of the file format the DLL is operative to read and write.

The method may further include programming the configuration editor DLL to include a version retrieval function named CFED_Version( ). The CFED_Version( ) function corresponds to a function which is operative when called to return to the calling program a string, which indicates the version number(s) of the interface and/or application that the DLL is compatible with.

The method may also include programming the configuration editor DLL to include a file organization retrieval function named CFED_GetFileOrg( ). The CFED_GetFileOrg( ) function corresponds to a function which is operative when called to return to the calling program a string, which indicates whether the external records read or written by the DLL are in several files or a single file.

Also, the method may include programming the configuration editor DLL to include an open function named CFED_Open( ). The CFED_Open( ) function corresponds to a function which is operative when called to open the file(s) that the DLL needs to read or write the external format data.

In addition, the method may include programming the configuration editor DLL to include a close function named CFED_Close( ). The CFED_Close( ) function corresponds to a function which is operative when called to close file(s) opened by the DLL.

The method may further include programming the configuration editor DLL to include a read function named CFED_DataRead( ). The CFED_DataRead( ) function corresponds to a function which is operative when called to read an ATM configuration data record from the file(s) opened with the DLL.

The method may further include programming the configuration editor DLL to include a write function named CFED_DataWrite( ). The CFED_DataWrite( ) function corresponds to a function which is operative when called to write an ATM configuration data record to the file(s) opened with the DLL.

An exemplary embodiment of the configuration editor software may call these functions. For example, to determine and display a listing of the available formats that can be converted by the configuration editor software, the software may call the CFED_FormatName( ) functions of each configuration editor DLL that is present in the specified data store of configuration editor DLLs. The CFED_FormatName( ) function when called by the configuration editor software returns a display name for the file format associated with the DLL. By calling the CFED_FormatName for each DLL present in the data store, the configuration editor software is enabled to generate a dynamic listing of conversion file formats. As discussed previously, with respect to FIG. 28, the configuration editor may then display the listing of conversion formats (such as in a menu 502) and may be responsive to a selection by a user of one of the file formats listed to perform a data conversion using the DLL associated with the selected file format.

The configuration editor software may also call the CFED_GetFile Org( ) function for the selected DLL. The CFED_GetFileOrg( ) function may return a 0 if all ATM configuration data records are in a single file. The CFED_GetFileOrg( ) function may return a 1 if the records are stored in files depending on type. After calling the CFED_GetFileOrg( ) function, the configuration editor may call the CFED_Open( ) function to open the selected external file for reading or writing. Once the file is open, the configuration editor may call either the CFED_DataRead( ) or the DFED_DataWrite( ) functions, depending on whether the user is reading from the opened file(s) or writing to the opened files(s). Once the configuration editor has completed the data read or write operations, the software may call the CFED_Close( ) function to close all of the one or more files opened by the DLL.

In order to keep track of the file processing information (such as the current file number or the current record number) between function calls, the described exemplary method may include generating configuration editor DLLs, which include a user handle that is passed to and from each function. Each configuration editor DLL may have a unique user handle structure which includes the information necessary to maintain the current state of the DLL. In an exemplary embodiment of the configuration editor software, the software only needs to pass and receive a memory address of the user_handle structure to and from the functions of the DLL.

An example of a user handle 240 for a single data format is shown in FIG. 6. Here the user handle 240 may include a name, such as HAN, and may define structure variables such as recordmap, tempstatus, process, first_rec_flag, filetype and fp. Here, the recordmap variable corresponds to a bitmap which indicates which record types should be processed. The tempstatus variable temporarily holds an end of file (EOF) status so that EOF is not returned to the application before all processes have been performed. The process variable indicates whether or not to process the next record in the file. The first_rec_flag variable indicates whether or not the current record is the first record in the file. The file type variable indicates the record type of the current record. The fp variable is a file handle which points to the file containing all data which is to be imported or exported.

An example of a user handle 250 for a multiple data format is shown in FIG. 7. Here the user handle 250 may also include a name, such as HAN, and may define variables such as filetype, rec_num, current_file, object, process_file. The object variable is an array of pointers to file objects which are processed by the function. The current_file variable stores the current file being processed. The filetype variable is an array of values which indicates the configuration data type corresponding to each of the files pointed to by the object variable. The rec_num variable in the structure stores the current record number. The filetype variable may have values ranging between 1 and 8 for example, where a value of 1 corresponds to a screen record, a value of 2 corresponds to a state record, a value of 3 corresponds to a miscellaneous configuration record, a value of 4 corresponds to a terminal type record, a value of 5 corresponds to a FIT record and a value of 8 corresponds to a format template record. Thus, if the portion of the array filetype[0] stores a value of 1, then the object[0] corresponds to a screen configuration data record.

The exemplary embodiment of the method for generating the configuration editor DLLs includes generating software code for the functions of the DLLs. For example, the CFED_FormatName( ) function is operative to return a name or description of the external file formats that the DLL reads and writes. Thus, the described method may include having a programmer generate with a computer a CFED_FormatName( ) function which is operative to return a string 262 with a name or description associated with the DLL. FIG. 8 shows an example of the programming source code 260 created for the CFED_FormatName( ) function of a DLL that is operative to read and write to a Diebold "PACE TLG 1.10" ATM configuration file. As discussed previously, the string returned by the function may be displayed in a listing 502 of selectable menu items 504, such as is shown in FIG. 28.

The described exemplary embodiment of the method may further include having a programmer generate with a computer a CFED_Version( ) function which is operative to return a string, which describes the version of the interface that the DLL conforms to. FIG. 9 shows an example of the programming code 270, created for the CFED_Version( ) function of a DLL that returns the version number "1.10".

Also, the described exemplary embodiment of the method may include having a programmer generate with a computer a CFED_GetFile_Org( ) function which is operative to return a value which indicates whether the ATM configuration records accessed by the DLL are in one or several files. FIG. 10 shows an example of the programming code 280, created for the CFED_GetFile_Org( ) function of a DLL that accesses ATM configuration records that are located in a single file. As discussed previously, a return value of 0 corresponds to the configuration records being located in a single file and a value of 1 corresponds to the configuration records being located in multiple files. However, it is to be understood that in alternative exemplary embodiments different return values may be used. Also, a corresponding function may return a value that corresponds to the number of files that contain the configuration records.

The described exemplary embodiment of the method may further include having a programmer generate with a computer a CFED_Open( ) function which is operative to open the files that need to be accessed, to either read or write ATM configuration data records by the DLL. FIG. 11 shows a beginning portion 290 and FIG. 12 shows the remaining portion 292 of an example of programming code created for the CFED_Open( ) function of a DLL that accesses configuration data records from only a single file. Here, the function creates a user handle of the previously described structure type named HAN.

As discussed previously, the user handle is used to keep track of the current state of the DLL. The function returns the address of this user handle so that the configuration editor software may send it to the later used functions of CFED_DataRead, CFED_DataWrite, and CFED_Close. The functions may be programmed so that if an error occurs opening the file, the memory allocated to the user handle is immediately freed and status is set to a value representative of the error, such as the value of CFED_No_File, defined in the previously described header file.

FIG. 13 shows a chart 300 that lists arguments that are passed to the CFED_Open( ) function of the DLL generated in the exemplary embodiment of the method. These arguments correspond to the variables of "Names", "Function", "status" and "recordmap" for the CFED_Open( ) function. The "Names" variable corresponds to a structure that is passed in as an array to the function. The array contains the names of the required files as well as their file type. The element 'FileName', includes the full path of the file name. The element of Filetype holds a value representative of the type of configuration data stored in the corresponding file. The "Function" variable includes a value which indicates whether the CFED_Open( ) function is to be used to read or write to the file(s) being accessed. The "status" variable is used to receive the status of the function. The "recordmap" is a bitmap indicating which record types should be processed.

FIG. 14 shows a table 310, which includes an example of possible values for the arguments passed to the CFED_Open( ) function for the case where multiple files are read by the DLL. The "Names" structure includes a listing of files 312 to access and their associated file types 314. The argument "Function" includes the value of "r", which indicates that the files will be read by the function. FIG. 14 also shows a table 320, which includes an example of possible values for the arguments passed to the CFED_Open( ) function for the case where a single file is to be written by the DLL. Here, the "Names" structure includes a single element which lists the single file 322 to access. The associated file type 314 indicates that all of the types of configuration records are included in the single file. In addition, the argument "Function" for this example includes the value of "w" which indicates that the files will be written to by the function.

The described exemplary embodiment of the method may include having a programmer generate with a computer a CFED_Close( ) function, which is operative to close the files opened with the CFED_Open( ) function. FIG. 15 shows an example of the programming code 350, created for the CFED_Close( ) function of a configuration editor DLL. This described exemplary embodiment of the function accepts the address of the previously described user handle as an argument. The function is operative to close the files referenced by the user handle and deallocate the memory used for the user handle. The function returns a status value which indicates whether or not the file(s) were actually closed.

The described exemplary embodiment of the method may further include having a programmer generate with a computer a CFED_DataRead( ) function which is operative to read ATM configuration data from the files opened with the CFED_Open( ) function. FIG. 16 shows an example of the programming code 360, created for the CFED_DataRead( ) function of a configuration editor DLL.

The function may be programmed to read in and pass back a single specified record. Thus, the configuration editor may call the CFED_DataRead( ) function for every record in the file. When the file has been completely read, the CFED_Open function may be programmed to return a status corresponding to CFED_EOF (end of file).

Figure 18:
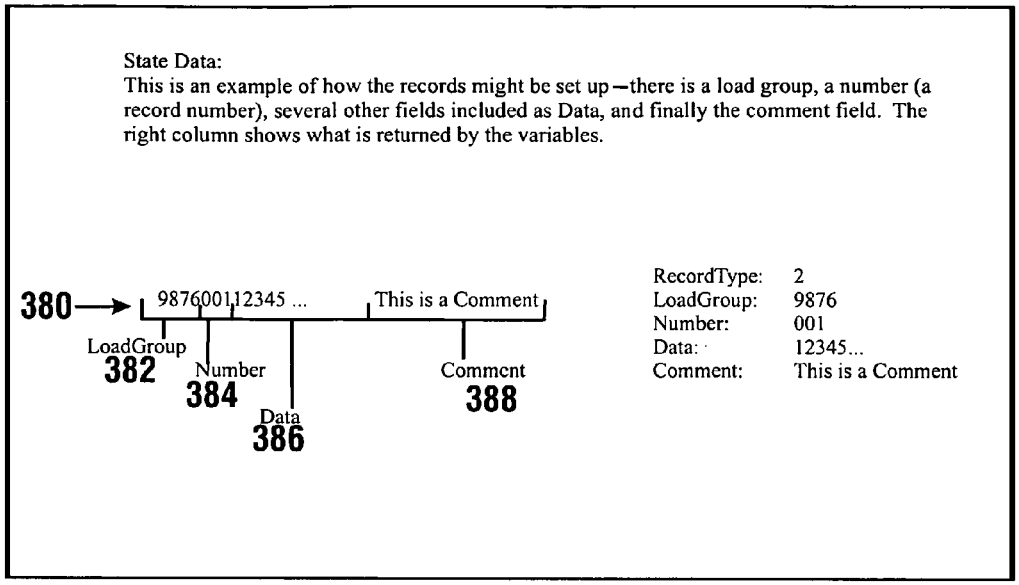
FIG. 18 shows an example of a record that may be read from a configuration file using the CFED_DataRead( ) function.

FIG. 18 shows an example of an ATM configuration data record that may be read from an ATM configuration file using the CFED_DataRead( ) function. Here, the record corresponds to a state configuration data record. In this example, the state record may include indicia representative of the load group 382, the record number 384, the record data 286 and a record comment 388. The exemplary embodiment of the CFED_DataRead( ) function may be programmed to read this record in response to the current state of the DLL specified by the user handle argument passed to the function. The function may be programmed to store the retrieved data for the read record into the corresponding variables passed to the function of "RecordType", "LoadGroup", "Number", "Data" and "Comment". FIG. 17 shows a table which lists these variables associated with the CFED_DataRead( ) function.

In this described exemplary embodiment, the "RecordType" variable may be used to store the record type of the current configuration data record being read. The "LoadGroup" variable may be used to store the four character value which specifies the configuration load group the record is associated with. If there is no load group the CFED_DataRead( ) function may be programmed to ignore this parameter. The "Number" variable may be used to store the three byte string which indicates a record number or other number associated with the current record being read. The "Data" variable may be used to store the data portion of the current record being read. The "Comment" variable may be used to store the comment portion of the current record being read. After the record as been read and the function variables populated, the CFED_DataRead( ) function may be programmed to return a status value which indicates whether or not the function has been completed successfully.

Figure 19:
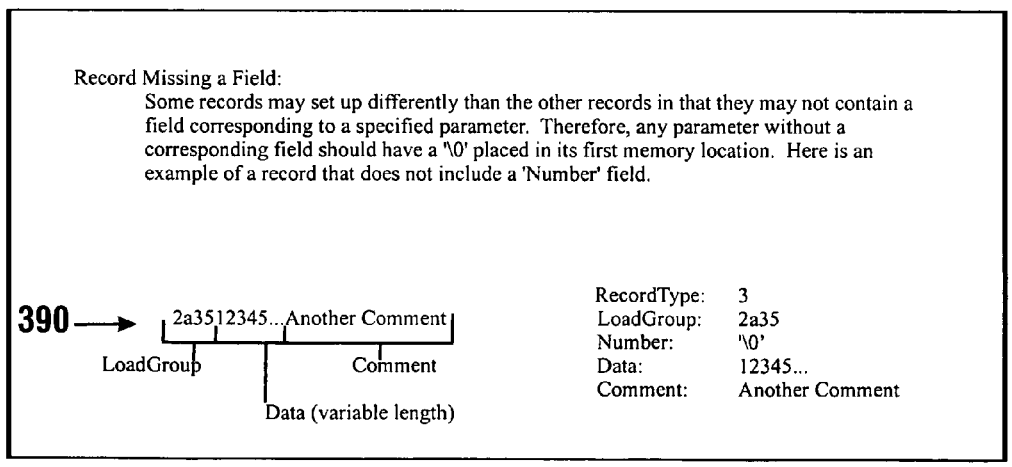
FIG. 19 shows an example of a record in which a standard field in the ATM configuration data is not present.

FIG. 19 shows an example of an ATM configuration data record in which a standard field is missing. To cover this situation, the exemplary embodiment of the method may be programmed to store a value in the function variable which indicates that the record does not include data corresponding to the function variable. Such a value may include a "\0" or other termination or null value flag which informs the configuration editor that there is no actual data in the record for this type of information.

The described exemplary embodiment of the method may further include having a programmer generate with a computer a CFED_DataWrite( ) function which is operative to write ATM configuration data records to file(s), database or other data store. FIG. 20 shows an example of the programming code 400 created for the CFED_DataWrite( ) function of a configuration editor DLL.

Here, the CFED_DataWrite( ) function is programmed to receive arguments for writing a single record. FIG. 21 shows a table which lists the variables associated with the CFED_DataWrite( ) function. In the exemplary embodiment, the function is programmed to accept the arguments of "RecordType", "user_handle", "LoadGroup", "Number", "Data" and "Comment". The function is responsive to these variables to generate a record in the appropriate format for the type of external format file that the DLL is operative to write.

When the record has been written out to the file, the function may be programmed to return a status indicating whether or not the function was competed successfully.

In the exemplary embodiment, the configuration editor expects to receive certain types of values in the LoadGroup, Number, Data and Comment variables populated by the CFED_DataRead( ) function. The exemplary CFED_DataRead( ) function is programmed in the exemplary embodiment of the method to convert the data read from the file for each record to these specific values expected by the configuration editor software.

Likewise, the CFED_DataWrite( ) function can expect to receive these same types of values from the configuration editor. The CFED_DataWrite( ) function may then be programmed to convert these received values to the corresponding types of values that are appropriate for the file format being written.

For the exemplary embodiment, FIGS. 22–27 show the types of values for the variables that are expected to be received by the configuration editor software from the CFED_DataRead( ) function for the different ATM configuration data record types. Likewise, the CFED_DataWrite( ) function can expect to receive these types of values when called by the configuration editor software.

Once the source code for the above functions has been written by a programmer for a particular format or type of configuration record(s), the source code may be compiled using a computer to generate the completed DLL. The DLL may then be placed in the file directory, or other data store of configuration editor DLLs, for access by the configuration editor software. As discussed previously, the DLL generated in the described manner will be automatically usable by an exemplary embodiment of the ATM configuration editor software and will be added to the applicable menu items or other user interface controls for selection by a user. The user may then use the DLL to produce suitable configuration data for one or more ATMs. The produced configuration data may then be transmitted and loaded to the selected ATMs, and thereafter is used by the ATM computers to control operation thereof.

Thus, the new method of updating an ATM configuration editing system achieves one or more of the above stated objectives, eliminates difficulties encountered in the use of prior devices and systems, solves problems and attains the desirable results described herein.

In the foregoing description, certain terms have been used for brevity, clarity and understanding, however no unnecessary limitations are to be implied therefrom because such terms are used for descriptive purposes and are intended to be broadly construed. Moreover, the descriptions and illustrations herein are by way of examples, and the invention is not limited to the exact details shown and described.

In the following claims, any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith, shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. A method for generating an ATM configuration editor software component library which is operative to access ATM configuration data records responsive to an ATM configuration editor software application, comprising:
   a) generating with at least one computer, software code for the library which includes a first function operative to cause a computer to return a description of an ATM configuration data format;
   b) generating with the at least one computer, software code for the library which includes a second function operative to cause a computer to read at least one ATM configuration data record from at least one external source; and
   c) generating with the at least one computer, software code for the library which includes a third function operative to cause a computer to write at least one ATM configuration data record to the at least one external source.

2. The method according to claim 1, wherein in steps (b) and (c) the at least one external source includes at least one file, wherein the at least one file includes stored therein the at least one ATM configuration data record.

3. The method according to claim 2, further comprising:
   d) generating with the at least one computer, software code for the library which includes a fourth function operative to cause a computer to open the at least one file; and e) generating with the at least one computer, software code for the library which includes a fifth function operative to cause a computer to close the at least one file.

4. The method according to claim 2, further comprising:
d) storing the library in a data store that is accessible by an ATM configuration editor software application operating in at least one second computer;
e) calling the first function of the library with the ATM configuration editor software application;
f) causing with the first function, the at least one second computer to return a description of the ATM configuration data format associated with the library to the ATM configuration editor software application;
g) generating with the ATM configuration editor software application a user selectable listing of ATM configuration data formats, wherein the listing include the description of the ATM configuration data format returned from the library; and
h) displaying the listing through at least one output device of the at least one second computer.

5. The method according to claim 4, further comprising:
i) calling the third function of the library with the ATM configuration editor software application, wherein the third function causes the at least one second computer to write at least one ATM configuration data record to at least one file; and
j) causing an ATM including a cash dispenser to operate responsive to at least a portion of the data in the at least one file.

6. The method according to claim 5, further comprising:
k) prior to step (i), calling the second function of the library with the ATM configuration editor software application, wherein the second function causes the at least one second computer to read at least one ATM configuration data record from the at least one file.

7. The method according to claim 6, further comprising:
l) wherein prior to (i) and after (k) modifying the at least one ATM configuration data record with the ATM configuration editor software application.

8. The method according to claim 1, wherein in step (b) the second function is operative to cause a computer to parse the at least one ATM configuration data record and store the parsed data in at least one variable, wherein when the second function is called by an ATM configuration editor software application, the parsed data stored in the at least one variable is accessible by the ATM configuration editor software application.

9. The method according to claim 8, wherein in step (b) the at least one variable includes a record type variable, where the second function is operative to store data representative of a type of ATM configuration data in the record type variable.

10. The method according to claim 9, wherein in step (b) the data representative of the type of ATM configuration data is representative of at least one of screen records, state records, terminal type records, financial institution table (FIT) records, and format template records.

11. The method according to claim 9, wherein in step (b) the at least one variable includes a load group variable, wherein the second function is operative to store data representative of a configuration load group in the load group variable.

12. The method according to claim 1, wherein in step (c) the third function is operative to cause a computer to construct at least one ATM configuration data record responsive to data stored in at least one variable.

13. The method according to claim 12, wherein in step (c) the at least one ATM configuration data record includes data representative of a type of ATM configuration data, wherein the data representative of the type of ATM configuration data is representative of at least one of screen records, state records, terminal type records, financial institution table (FIT) records, and format template records.

14. The method according to claim 1, further comprising:
d) generating with the at least one computer, software code for the library which includes a fourth function operative to cause a computer to return data representative of an interface version associated with the library to an ATM configuration editor software application.

15. A method comprising:
a) receiving with an editing computer, first format configuration data, wherein the first format configuration data is in a first format and comprises data adapted to control operation of an automated banking machine including a cash dispenser;
b) providing at least one input to the editing computer, wherein the at least one input corresponds to selecting the first format from among a plurality of formats;
c) generating through operation of the editing computer responsive to the at least one input provided in (b), second format configuration data corresponding to the first format configuration data;
d) transmitting the second format configuration data generated in (c) to at least one automated banking machine including a cash dispenser located remotely of the editing computer;
e) storing the configuration data transmitted in (d) in a data store associated with a computer in the at least one automated banking machine.

16. The method according to claim 15 and further comprising:
f) subsequent to (e), operating the at least one automated banking machine to dispense cash to a user of the machine through operation of the cash dispenser.

17. The method according to claim 16 and further comprising;
prior to (a) generating through operation of at least one computer, software code which includes a first function which operates to provide a description of the first format and storing the generated software code in a software component library stored in at least one data store in operative connection with the editing computer;
wherein in (c) the first function is used by the editing computer.

18. The method according to claim 17, wherein (c) includes:
responsive to the at least one input provided in (b), causing with the editing computer, the first function to parse the first format configuration data to produce parsed first format configuration data; and
generating through operation of the editing computer, the second format configuration data corresponding to the parsed first format configuration data.

19. A method comprising:
a) updating an ATM configuration editor software application operating in at least one computer by including in operative connection therewith a further ATM configuration editor software component library, wherein the further ATM configuration editor software component library is included among a plurality of other ATM configuration editor software component libraries stored in a data store, wherein each of the libraries includes a first software function and a second software function, wherein each respective second function of each library is operative to parse a respective ATM configuration data record format, wherein each respective first function of each library is operative to generate a respective description associated with an ATM configuration data record format that the respective second function of the respective library is operative to parse;

b) through operation of the editor software application, calling the first functions of each of the plurality of libraries to generate the plurality of descriptions associated with the plurality of ATM configuration data record formats that the plurality of libraries are operative to parse, wherein the generated descriptions include a description generated by the first function of the further ATM configuration editor software component library;

c) through operation of the editor software application, causing to be displayed through an output device operatively connected with the at least one computer, indicia corresponding to the plurality of descriptions generated in (b);

d) receiving at least one input through an input device in operative connection with the at least one computer, wherein the at least one input corresponds to a selection of a portion of the indicia displayed in (c), wherein the selected portion corresponds to the description generated in (b) by the first function of the further ATM configuration editor software component library;

e) through operation of the editor software application, responsive to the at least one input received in (d), calling the second function of the further ATM configuration editor software component library, wherein the called second function causes the at least one computer to parse at least one ATM configuration data record in the ATM configuration data record format corresponding to the called second function, into a form that is editable by the editor software application to produce ATM configuration data usable to configure a computer located in at least one cash dispensing ATM.

20. The method according to claim 19, further comprising:

f) prior to (a) through operation of the ATM configuration editor software application, calling the first functions of each of the plurality of ATM configuration editor software component libraries to generate the plurality of ATM configuration data format descriptions associated with the libraries, wherein the generated descriptions do not include the description generated by the first function of the further ATM configuration editor software component library;

g) prior to (a) through operation of the ATM configuration editor software application, displaying through an output device operatively connected with at least one computer, a user selectable listing of a plurality of ATM configuration data record formats, wherein the listing includes indicia corresponding to the plurality of ATM configuration data record format descriptions generated in (f), wherein the listing does not include indicia corresponding to the description generated by the first function of the farther ATM configuration editor software component library.

* * * * *